United States Patent [19]

Chaggaris

[11] 4,328,407
[45] May 4, 1982

[54] HEATING SYSTEM AND CONTROL

[75] Inventor: Elias G. Chaggaris, Mercerville, N.J.

[73] Assignee: Conergy Associates, Mercerville, N.J.

[21] Appl. No.: 109,522

[22] Filed: Jan. 4, 1980

[51] Int. Cl.³ .............................................. H05B 1/02
[52] U.S. Cl. .................................... 219/508; 219/512; 219/510; 219/364; 337/337; 337/340; 337/383; 337/363
[58] Field of Search ............................. 219/508–512, 219/364, 365, 378, 492, 326, 464, 449; 337/333, 337, 340, 363, 383, 338

[56] References Cited

U.S. PATENT DOCUMENTS

| | | | |
|---|---|---|---|
| 2,850,610 | 9/1958 | Kasuga | 219/509 X |
| 3,026,393 | 3/1962 | Quirk | 337/338 |
| 3,070,684 | 12/1962 | Turner | 219/508 |
| 3,257,544 | 6/1966 | Benjamin, Jr. | 219/510 X |
| 4,110,600 | 8/1978 | Spotts et al. | 219/508 |
| 4,112,406 | 9/1978 | Hickling | 337/338 |
| 4,170,729 | 10/1979 | Lane et al. | 219/508 |

Primary Examiner—B. A. Reynolds
Assistant Examiner—M. H. Paschall
Attorney, Agent, or Firm—Frank A. Steinhilper

[57] ABSTRACT

An electric heating system employs a control unit including means to connect a resistance heater to a three pole power source and a switch to switch the connections between full voltage and low voltage as temperature is more than or less than several degrees colder than the set temperature. More uniform heating, greater comfort and significant energy savings results.

7 Claims, 6 Drawing Figures

HEATING SYSTEM AND CONTROL

THE BACKGROUND OF THE INVENTION

In ordinary installations of electric resistance heaters for space heating, such as for home, office or industrial buildings, the installation generally is engineered for the worst case or the most extreme weather conditions expected in the area. The consequence, of course, is that the installed heating power is larger than is necessary for a moderate day and is even larger than is necessary for a normal Winter day. Thus, the heating system normally is turned on and off frequently, and heating tends to be significantly uneven. This has numerous disadvantages, both in discomfort through the frequent on-and-off cycles and also as a consequence of the inefficiency resulting from constant heating and cooling. Face it: excessive capacity in an energy using device ends up wasting energy.

The problems of efficiency have recently become of increasing importance as a result of an energy shortage in much of the industrial world. Accordingly, it is highly desirable to make such improvements as will result in reduction of the consumption of energy. This need for energy conservation is so extreme that it is frequently necessary to accept and put up with significant discomfort and inconvenience. It is, therefore, both desirable and surprising to find that there can be an improvement in the efficiency of an operation coupled with an improvement in the comfort and convenience of the heating system.

Variable heating can be achieved by the use of two separate heating systems, one of lower capacity used for moderate heating requirements and another, of higher capacity, being used for more extreme requirements. One such system is disclosed in Boehm, U.S. Pat. No. 2,789,197. Such systems are expensive to install and usually result in the lower capacity system receiving excessive use and the higher capacity system receiving very moderat use. Similarly, controls that generate proportional power in a single system are expensive and, while desirable, have not been economically feasible.

GENERAL NATURE OF THE INVENTION

According to the present invention an electric heating system which is engineered for the coldest weather and has a basic capacity adequate for such weather is controlled to provide the greater amount of heat from the one single system in colder weather and a lesser amount of heat in all of the same units of the same system in relatively less cold weather. Unlike previous attempts to reach this result, the present invention is simple and easy to install and inexpensive both in installation and in use. It also is more comfortable for the human beings in the space being heated.

The result is achieved by providing a plurality of controlled electric voltages of the entire heating system and to all the heating units in the installation. In the coldest weather or during times of maximum heat loss, the full available voltage and current are applied to the heating system, while in moderate weather, or when experiencing lesser heat loss, a lesser potential is applied to the system, causing a smaller electrical current to flow through all the heaters in the system.

The usual electrical installation for heating purposes in the U.S. is a two phase, three wire, 240 volt system, and the present invention is described in conjunction with such a system. Ordinarily, such a three wire system has a central neutral potential, usually ground and two so called hot leads which are equal and of opposite phase so that the neutral or ground potential is halfway between. The present invention employs a novel control such that when full heat is desired the resistance heaters are connected across the two extreme potentials or hot leads and when less heat is desired, the connection is between one of the extreme potentials and the neutral potential.

The invention is more clearly illustrated in the drawings which:

DETAILED DESCRIPTION OF THE INVENTION

Figure 1:
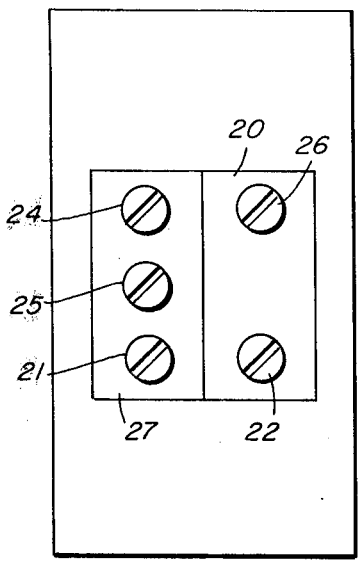
FIG. 1 is a rear view of a temperature control unit according to one embodiment of the invention.
Figure 2:
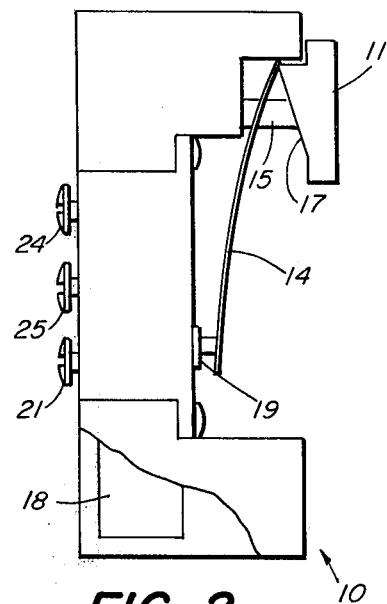
FIG. 2 is a side view of the unit of FIG. 1.
Figure 3:
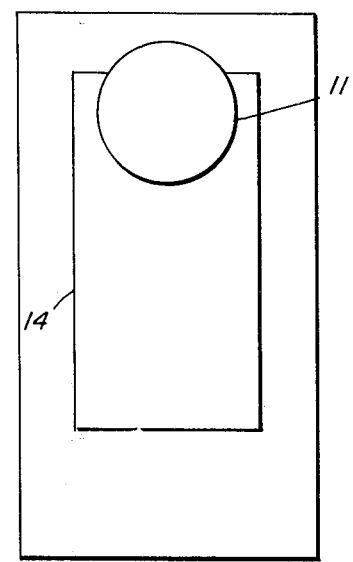
FIG. 3 is a front view of the unit of FIG. 1.

In FIGS. 1, 2, and 3 is illustrated a control unit generally designated 10 including a control knob 11 rotably mounted on post 15, similar in appearance to a conventional thermostat for the control of a heating system. On the front face of unit 10 is a panel 12 (not shown in FIG. 2) behind which is a bimetallic heat sensor 14. Control knob 11 is mounted or adapted to adjust the setting of a sensor 14 in a conventional manner (See FIG. 4) relative to the temperature of the room or area being heated. As illustrated in FIG. 2 the rear 17 of knob 11 is bevelled so that as it is turned sensor 14 is adjustably urged toward a contact plunger 19 which operates an on-off switch 20. Thus, with changing temperature the switch 20 is turned on or off at a temperature controlled by knob 11. Suitable markings (not shown) on the knob indicate the control temperature.

In FIG. 1 is illustrated the rear of control unit 10, showing the terminal connections 21 and 22 to the heater and an input terminal 24 adapted to be connected to one live pole of the power source, a neutral or ground terminal 25 adapted to be connected to the neutral or ground pole of the power source, and the second input terminal 26, adapted to be connected to the opposite pole of the power source. For convenience, the terminals will be called hot terminals or hot leads (terminals 38 and 40 of FIGS. 4 to 6) or a first high potential 38 and a second high potential 40.

Figure 4:
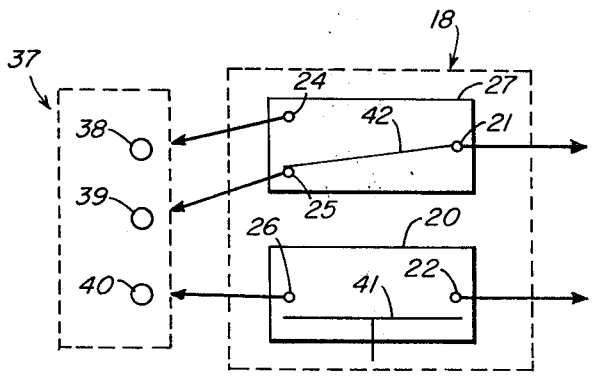
FIG. 4 is a diagrammatic illustration of a heating installation according to one embodiment of the invention, illustrated in the off condition.
Figure 4:
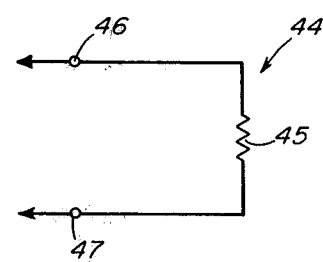
Figure 5:
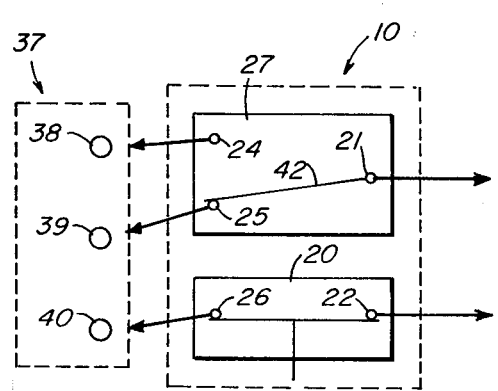
FIG. 5 is a diagrammatic of the embodiment of the installation shown in FIG. 4 illustrated in a low heat condition.
Figure 6:
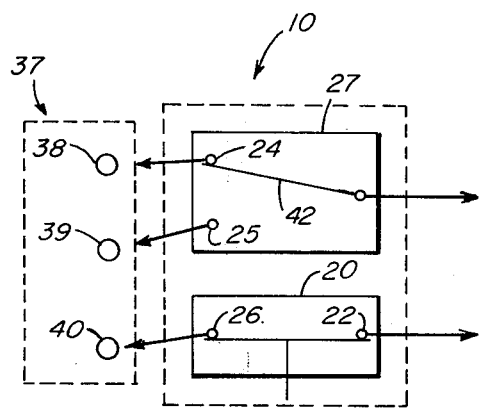
FIG. 6 is a diagrammatic view of the installation of FIG. 4 shown in a high heat condition.

Mounted within the control unit 10, is a switch unit 18 (See also FIG. 4) which includes an off-on switch 20 acting to connect or disconnect terminal 22 to terminal 26 as shown in FIGS. 4-6. In the alternative, terminals 24, 25 and 26 can be low voltage terminals, for example, 18 volt terminals, acting to control relays (not shown) which, in turn connect the resistance heater to the high or neutral poles of a power source.

Contact plunger 19 operates two switches, first switch 20 (in FIG. 4) and second switch 27 (also in FIG. 4). When the temperature sensed by sensor 14 drops below the set temperature, switch 20 is activated as the sensor bimetallic strip depresses plunger 19 to a first level, connecting the resistance heater to the lower power source. If the temperature drops further, for example, 5° F. lower, plunger 19 is further depressed to activate second switch 27 and connect the heater to a higher power source.

In FIG. 4 is shown diagrammatically a heating system according to one embodiment of the invention. A heater generally designated 44 comprises an electric resistance element 45 having electric leads to terminals 46 and 47 adapted to be connected to terminals 21 and 22 of control unit 10.

The control unit generally designated 10 comprising a first thermostatically controlled switch 20 and a second thermostatically controlled switch 27. Switch 20 has an output pole 22 adapted to be connected to the heater as, for example, being adapted to be connected to terminal 47 of heater 44. Switch 27 has a similar output pole 21 adapted to be connected to the heater as, for example, to pole 46 of heater 44.

A 240 volt, two phase, three wire power source 37 as is conventional is illustrated in outline with three poles or terminals. The first pole or hot lead 38 is adapted to be connected to terminal 24 of switch 27, the ground pole 39 to terminal 25 and the second or opposite pole or hot lead 40 to terminal 26 of switch 27 as herein described. Accordingly, in switch 27 there are two input poles 24 and 25, corresponding to a hot terminal and ground of the power source. In switch 20 a single input terminal 26 is adapted to be connected to second hot pole 40 of the power source. Accordingly, between pole 24 of switch 27 and pole 26 of switch 20 there is a 240 volt potential, while between pole 25 of switch 27 and pole 26 of switch 20 there is a 120 volt potential. Switch 20 is a normally open or on-off switch having an arm 41 adapted to be thrown into or out of contact with terminals 22 and 26 to close or open the switch. Switch 27 is a single pole double throw switch having an arm 42 which can be moved or thrown between pole 24 or pole 25.

In FIG. 5, pole 25 is electrically connected through heater 44 to pole 26. The second switch 27 is adapted to be switched over so that pole 26 is connected through heater 44 to pole 24 in the position shown in FIG. 6. In FIG. 5 the controller is illustrated with switch 20 in the closed position. In this position heater 44 is connected across poles 39 and 40 of the power source and thus is supplied with a lower potential such as, for example, a 120 volt potential.

In FIG. 6 switch 20 is again in the closed position and switch 27 in this case has been thrown to the opposite position, whereby heater 44 is connected across pole 38 and pole 40, thus supplying heater 44 with the full voltage of the power source. If, in fact, an ordinary 240 volt system is used, the heater 44 operates at full power in the position of FIG. 6 and at ¼ power in the position of FIG. 5.

As can be seen readily, the heating system as shown in FIG. 4 is in the "off" position and heater 44 is connected only to ground or other neutral position. As also can be seen the system as illustrated in FIG. 5 has the heater 44 connected to a relatively lower voltage so that the heater operates at a lower power. The conditions for FIG. 5 can be set by the manufacturer, but according to a preferred embodiment of the invention it is expected that the heating system will operate in the following mode: When the room temperature or other subject to be heated is in the desired range, for example within 5° F. of the set temperature, the control is in the condition shown in FIG. 5 and the heater is connected across the moderate voltage between poles 39 and 40. When the space being heated is colder, for example more than 5° F. below the set temperature, switch 27 moves to the position shown in FIG. 6 and the heater is thus connected to the full power source. The result is that in moderate weather conditions or in other conditions where heat loss is low the heater provides gentle heat in a more efficient and less expensive manner than if it were suddenly switched on or off at full voltage. The full power of the heating is, accordingly, reserved for colder weather or other conditions where a diminished power level is inadequate.

It is to be understood that the specific embodiment of the invention illustrated in the FIGS. is an example of only one form of the invention. For example, instead of resistance heaters there may be employed other electric heaters adapted to operate at two different powers at two different voltages which can be supplied at several poles or outlets. Similarly, a 240 volt power source is usual in the United States, but other sources may be employed such as a three phase, four wire network which also is conventional in certain locations. In addition, relays or other switch control devices may be mounted in the control unit 10 and the switches themselves located elsewhere (as described herein) to avoid high voltages at the control unit. These and other modifications will be apparent to one skilled in the art.

I claim:

1. An energy conserving electric space heating system adapted to provide greater comfort to the occupants of the space being heated comprising
   at least one electrical resistance heater positioned to heat the desired space and having terminals for connection to a power source,
   an electrical power source adapted for connection to a power supply and including a first high potential element, a second and opposite high potential element and an intermediate potential element,
   a thermostat control unit at a location remote from said heater sensing a first predetermined control temperature and a second control temperature several degrees colder than said first temperature,
   a first switch operable from said control unit to switch a first terminal of said heater from an off position to a connection with said first high potential element upon sensing a temperature at or below said first control temperature, and
   a second switch operable from said control unit to switch a second terminal of said heater between said second high potential element and said intermediate potential element upon sensing said second, lower, temperature,
   whereby at temperatures between said first temperature and said second temperature the heater is operated at a reduced voltage represented by the difference between the first high potential element and the neutral element.

2. The heating system according to claim 1 wherein said intermediate terminal is a ground potential.

3. A control unit for operating an electric resistance space heater from a three pole electric power supply source wherein connecting an electric resistance across a first and second pole operates said heater at full power and wherein connecting said heater across a third neutral pole and either of said first and second poles operates said heater at reduced power, said unit comprising a control unit having two thermostatically controlled switches, a first of said switches operating at a first predetermined control temperature, a second of said switches operating at a second control temperature, a single responsive device operating both of said switches and adapted to energize said first switch at a temperature at least as low as said first predetermined control temperature, and to energize said second switch at a temperature several degrees lower than said first control temperature, means operated by said first switch adapted to connect a first terminal of a resistance heater to a first high potential terminal of a power source, and means operated by said second switch to switch a second terminal of a resistance heater to a neutral terminal of a power source at temperatures above said second control temperature and an opposite high potential terminal of a power source when energized by said temperature responsive device.

4. A control unit for operating an electric resistance space heater from a three pole electric power source comprising a first high potential input terminal for connected to a first high potential pole of said power source, a second high potential input terminal for connection to a second and opposite high potential pole of said power source, a third input terminal for connection to an intermediate neutral potential pole of said power source, first and second output terminals for connection to at least one resistance heater, a first switch operable at a first predetermined control temperature, a second switch operable at a second control temperature, a single temperature responsive device operating both of said switches and adapted to energize said first switch at a temperature at least as low as said first predetermined control temperature, and to energize said second switch at a temperature several degrees lower than said of first control temperature, said first switch operating to connect said first output terminal to said first high potential input terminal at and below said first temperature, said second switch operating to connect said second output terminal to said third input terminal at temperatures higher than said second control temperature and operating to connect said second output terminal to said second high potential input terminal when energized by said temperature responsive device.

5. The control unit of claim 4, wherein said input terminals are adapted for connection to a 240 volt, three pole A.C. power source, and wherein said third input terminal is adapted to be connected to ground.

6. An electric space heating system comprising at least one electric resistance space heater, an electric power source adapted for connection to a power supply and including a first high potential element, a second and opposite high potential element, and a neutral ground potential element, a control unit comprising a first high potential input terminal for connection to a first hot pole of said power source, a second high potential input terminal for connection to a second and opposite hot pole of said power source, a third input terminal for connection to the ground pole of said power source, first and second output terminals for connection to said resistance heater, a first switch by said central unit operable at a first predetermined control temperature, a second switch by said central unit operable at a second control temperature, a single temperature responsive device operating both of said switches and adapted to energize said first switch at a temperature at least as low as said first predetermined control temperature, and to energize said second switch at a temperature several degrees lower than said first control temperature, said first switch operating to connect said first output terminal to said first high potential input terminal at and below said first temperature, said second switch operating when not energized to connect said second output terminal to said third input terminal and operating when energized to connect said second output terminal to said second high potential input terminal, whereby said space heater is operated at a higher power below said second temperature and at a lower power between said first and second temperatures.

7. The heating system of claim 6, adapted to operate from a three pole 240 volt power source.

* * * * *